UNITED STATES PATENT OFFICE.

WILLIAM R. SEIGLE, OF NEW YORK, N. Y.

METHOD OF IMPREGNATING POROUS OR BIBULOUS MATERIALS AND THE PRODUCT THEREOF.

1,395,744. Specification of Letters Patent. Patented Nov. 1, 1921.

No Drawing. Application filed June 28, 1920. Serial No. 392,376.

*To all whom it may concern:*

Be it known that I, WILLIAM R. SEIGLE, a citizen of the United States of America, and resident of New York, in the county of New York and State of New York, have invented new and useful Improvements in Methods of Impregnating Porous or Bibulous Materials and the Product Thereof, of which the following is a specification.

My invention consists in a method of impregnating porous or bibulous bodies with oily materials and compositions, and in one aspect is characterized by the impregnation of a porous, bibulous, or fibrous body with an oil which is molecularly saturated throughout; more specifically, by the completion of molecular saturation of the oily material *in situ*, i. e., in the impregnated body; more specifically still, by partial molecular saturation of the oil before it is incorporated in the body to be impregnated, and while it is still sufficiently fluid to be absorbed readily in the pores or interstices of the body, followed by complete molecular saturation *in situ* after impregnation of the body; more specifically still, by preliminary partial molecular saturation of the oil by hydrogenation, followed by polymerization-saturation *in situ*, after impregnation of the body.

In a more specific aspect, my invention relates to friction members for brakes, clutches and the like, and consists in a method of making brake linings, clutch rings, etc. and in the product of the method.

Porous or bibulous bodies, for example, bodies chiefly or wholly composed of woven or felted fibers, have for many purposes and for a long time been prepared for various mechanical services by impregnation with oils, asphalts, gums, etc., which act as more or less cementitious binders of the fibers of which the body is chiefly constituted. In particular, bodies composed chiefly of asbestos fiber, either woven, felted, or molded, have been treated with miscellaneous substances such as have just been mentioned, in order to render such bodies suitable for use as friction-material, as for brake linings, or linings for friction clutches. The main object of the invention herein described and claimed is to impregnate porous or bibulous bodies with a molecularly saturated oil, which is hardened or thickened by the molecular alteration characterized as saturation, and thus to provide materials adapted in eminent degree to many purposes, particularly to service as friction materials, in various situations.

Brake linings, brake-blocks, and friction clutch linings composed in whole or in part of fibrous material, porous or bibulous, and impregnated with miscellaneous cementitious binding material have been made and used for many years. As the service to which such things are applied involves the generation of heat by friction, it has long been the practice to employ asbestos fibers, either woven or felted, or molded to shape, because of the heat resistant character of asbestos. Structural strength is a prime requisite for such friction materials, which have to sustain the stresses of friction and are subject to severe abrasion. Without reinforcement of some kind, friction materials composed in whole or in part of fibrous material, especially asbestos fibers, are but poorly qualified to sustain the exacting requirements of service; woven brake linings and the like have usually been reinforced with wires, and the molded or felted friction materials have been structurally reinforced with fragments of metal or other wear-resisting materials; both classes of friction materials having a fibrous body have been almost universally reinforced by impregnation with oils, gums, asphalts, etc., which serve to cement the fibers together and improve the structural integrity of the friction material as a whole. The selection of an impregnating material has been the subject of much investigation and experiment. The desiderata are; that the impregnating material shall saturate the porous or bibulous body thoroughly and uniformly; that in its final condition it shall be firmly cementitious and preserve structural uniformity throughout; that in conjunction with the material —fiber, etc.—which is saturated, the impregnant shall provide a surface characterized by a friction-coefficient suitable to the purposes of service; that the impregnant shall be stable and not susceptible to deterioration either by the solvent action of liquid substances (e. g. mineral oils or gasolene) which may come in contact with the friction material.

At the outset, it is apparent that in order to insure complete and uniform impregnation of an already compact porous or bibulous body (e. g. felted and compressed asbestos board or blocks) the impregnant must be freely fluid, and that after impregnation, such fluid must undergo change so as to be eventually a firm, hard, solid substance, effectively cementitious, and capable of imparting toughness to the friction material; and such transformation of the original impregnant shall be complete and uniform throughout the impregnated body, for otherwise the reduction of the friction-material by abrasion will lay bare surfaces of material different in quality from that originally exposed.

The invention herein described and claimed, therefore, is in its principal aspects dependent upon or associated with the practice of another invention of mine, which consists of a method of modifying oils which are susceptible of polymerization, and of preparing sundry compositions of oils modified by the said method, and of the oily product of the said method, and is the subject matter of an application for Letters Patent of the United States, filed by me concurrently herewith, serially numbered 392,375. A description of the aforesaid invention to which that which is here the subject of claim may be regarded as ancillary, will elucidate the latter, and is as follows:

That invention consists of a method of modifying oils which are susceptible of polymerization and of preparing various compositions of oils, modified by the method, with bituminous, asphaltic, or resinous materials capable of solution in the oils, and of the products and compositions of matter which result from the employment of the method. The object is to produce a substance of oily character, thickened or hardened, which shall possess permanent constitution, be incapable of change by oxidation, at ordinarily encountered temperatures, effective as a binder or impregnant of fibrous structures such as leather, paper, mill board, felt, textiles, or porous blocks or bodies, and which shall when prepared and compounded, suitably to the purpose, impart to such impregnated materials frictional or adhesive qualities, and which shall lend itself also to modification by addition of bituminous, asphaltic or resinous substances which specially qualify the physical characteristics of the composition for special purposes, as by lending it adhesiveness, or modifying the frictional coefficient and surface character of the body which is impregnated or coated with the composition.

The drying oils have a molecular structure which is initially unsaturated, the phenomenon known as drying is the saturation of the molecules by union of free bonds with oxygen. As is well known, saturation of oils may be accomplished by union of the free bonds with hydrogen in the presence of a catalyst, notably nickel. Some oils, for example, China-wood oil (tung oil) and castor oil, are capable of self-saturation or polymerization when raised to a critical temperature. All these modes of molecular saturation are accompanied by a physical thickening or hardening of the oil.

Polymerization of an oil by the application of heat is a delicate process, because the polymerization temperature is dangerously near to that at which the molecular constitution of the oil is destroyed, the oil is liable to carbonize or char unless the temperature be most accurately and carefully controlled. If therefore, a porous material such as asbestos mill board or molded block, be saturated with a heat-polymerizable oil, and the attempt be made to effect molecular saturation (with consequent hardening) of the oil in situ by means of heat, the difficulties which always attend heat polymerization of such an oil are increased to such a degree that it is not easy to accomplish the object of impregnation of such a material with a completely molecularly saturated oil by this means; at all events so far as operation on an industrial scale and under industrial conditions is concerned.

For example, China-wood oil, or tung oil, is a drying oil, susceptible of polymerization under heat. The temperature of self-saturation or polymerization of its molecules is, however, so close to that at which the oil molecule is destroyed, that this oil can be thus rendered permanent in constitution, and no longer susceptible of molecular saturation by oxidation, only by the exercise of great care in the regulation of temperature and the distribution of heat to all parts of the oil. The physical change which marks polymerization is a thickening or hardening of the oil. If a sheet, say of asbestos mill board be saturated with tung oil, and then heated in an atmosphere devoid of oxygen (e. g. $CO_2$) the oil will become polymerized in situ, and its constitution become permanent and free from any liability to change, as by oxidation, the molecules having interengaged their free bonds. The requisite temperature for this transformation is not far from 300° C. and if the oil is not to suffer molecular disintegration, the application of heat should be gradual, and carefully guarded against rise of temperature above the minimum requisite to produce polymerization. Therefore, a more practical method of producing molecular saturation in the oil which I have invented will be as follows:

Subject tung oil to catalytic hydrogenation until its iodin number has fallen to between 120 and 130. At this degree of partial hydrogen-saturation, the oil will remain sufficiently fluid at a temperature from 120° to 130° C., to saturate readily a porous or interstitial body, such as a felted asbestos fiber block or mill board, and if the object be the impregnation of such a body, heat the partially hydrogenated tung oil to from 120° to 130° C. and impregnate the porous or bibulous body with it.

The oil, thus partially molecularly saturated by hydrogenation, will complete its molecular saturation, or satisfaction of free-bonds, by polymerization, at a temperature of 240° C., which is substantially lower than the temperature of polymerization of the oil in its original state, and does not endanger the molecular integrity of the oil. An oil, thus molecularly saturated and hardened constitutes base material which may be specially adapted to a miscellany of uses by the empirical selection of hydrocarbons which, like sundry asphalts, bitumens, pitches, resins, or gums, are solubly miscible in some proportion in the oil which is to be thickened by molecular saturation. These modifying substances, according to their quality, vary the adhesiveness of the finally resulting compound.

With the foregoing description of the method of molecularly saturating heat polymerizable oils which I have invented, the method of impregnating porous or bibulous bodies with a molecularly saturated and therefore hardened oil will be more clearly understood.

Whether an oil be heat-polymerized by itself, or in a porous body impregnated with it, the oil will harden or thicken to a permanent consistency and constitution.

In mass, the oil-product is an elastic jelly-like substance, slightly sticky or adhesive. When incorporated in a porous or interstitial body, like a felted or textile asbestos brake shoe or lining, this thickened oil serves as a fiber-binder, and lends a frictional quality to the surface of the body which is uniform, does not alter as the body wears away, and is functionally suitable for the purposes to which a brake shoe or lining is intended. Canvas or other driving belts can with advantage be impregnated with the partially molecularly saturated oil, and then heated to complete the molecular saturation, or may be coated or dressed with the elastic jelly-like oil-product, previously prepared and will be improved in their traction.

But while the oil-product above described may be used for various purposes without further modification, it is preferable to give the oil special treatment in order to adapt the final product more perfectly to special purposes.

If, for instance, the oil-composition is to be used as an impregnant for brake shoes or linings, I add to the partially hydrogenated tung oil—above described—a hard asphalt, such as gilsonite or grahamite, in proportions which are subject to variations within the maximum which will go into solution in the oil. An excess of this maximum may do no harm, but on the other hand is not believed to be of any benefit or advantage. If gilsonite be employed, the proportions may vary from one to ten per cent. on the weight of the oil. The maximum soluble in the oil at 130° C. is about twenty per cent.

Then heat the partially hydrogenated oil with its content of gilsonite to about 130° C., impregnate the porous body, such as a felted asbestos sheet, with the oil composition, and then heat the oil composition *in situ* to about 240° C., maintaining this temperature for several minutes, or for a time long enough to effect substantially complete molecular self-saturation, as determinable by the iodin test.

When the oil-gilsonite composition is heated and polymerized by itself, it thickens to a rubbery mass, which is elastic and not so tacky or sticky as the polymerized oil alone. The gilsonite modifies the physical constitution of the oil-product so that a brake lining impregnated with it offers a frictional surface which is harder and more resistant to wear than a lining impregnated with the polymerized oil product or base-material, alone. The uniformity and permanency of constitution of this impregnant insures uniformity in the friction surface and its co-efficient, as the brake lining body wears away.

The base-material is adapted to modification by other asphaltic, pitchy, bituminous, or resinous materials, provided these are solubly miscible in the oil from which the base material is developed; and according to the modifying material selected, the final composition will present specific and peculiar characteristics. For example: If it be desired to compound a belt dressing or strongly adhesive frictioning material, the composition should be stickier than that above described, which is adapted to produce a regulated sliding friction with a brake member, and such a stickier composition will result by adding about five per cent. by weight on the partially hydrogenated oil, of coal tar pitch, which dissolves in the oil. After completing the molecular saturation of the oil thus modified, by polymerization at 240° C. or thereabout, the product will be a sticky or gummy jelly, which, when spread upon or rubbed into a driving belt, will greatly increase the adhesion of the belt to a pulley.

Many oils can be molecularly saturated to a permanent constitution by catalytic hydrogenation, and if such hydrogenation could be practically carried on in an oil which has been absorbed into the pores or interstices of a body such as a felted asbestos brake shoe or lining, the result would doubtless be of the same character as that obtained by the method above described. But the physical obstacles to hydrogenation of an oil included in an impregnated porous or interstitial body are obvious, and so far as known, insuperable. The method above described, which is primarily characterized by molecular saturation of an oil by heat-polymerization, employs an agent, viz: heat, which will penetrate to all parts of the oil-saturated body, and effect molecular saturation of the impregnant as well in that situation as in another. The preliminary partial hydrogenation of the heat-poylmerizable oil suffices to reduce the polymerization temperature to a practically safe degree, while it does not render the oil sufficiently viscous to resist absorption by a porous or interstitial body; raising the temperature of the slightly thickened oil to 130° C. or thereabout suffices to make it perfectly fluid for the purpose.

If the impregnated body be heated in contact with air, the oil-composition will become molecularly saturated by oxidation at the surface, either in whole or in part, and a film of oxidized oil will be formed. This at once serves to inclose the inner portions of the oil-composition and protect them from the action of oxygen; the assumption by the oil composition of the critical temperature for polymerization presently brings about the final and permanent saturation-change.

The oxidized oil film at the surface of the body is of different constitution from the polymerized oil-product in the interior and must be removed by grinding, or by the abrasion of use, before the uniformly constituted material beneath comes into service.

If it be desired to prevent such superficial oxidation, the impregnated body may be baked in an inert atmosphere, e. g. of $CO_2$. But as the film of oxidized oil produced by heating in contact with air, is thin, and as it is often advisable to grind the brake shoe or lining to a true surface before putting it to use, the final finish by grinding of the impregnated body will remove the film of oxidized oil and lay bare a surface of material which is homogeneous with the entire mass beneath it.

What I claim and desire to secure by Letters Patent of the United States is:

1. The method of impregnating porous or bibulous material with an oily composition, comprising preparation of a heat-polymerizable oil by partial molecular saturation of its free bonds with an introduced reagent, filling the material with said partially molecularly saturated oil, and completion of molecular saturation of the oil within the material under heat.

2. The method of impregnating porous or bibulous material with an oily composition, comprising preparation of a heat-polymerizable oil by partially hydrogenating the oil, filling the material with the partially hydrogenated oil, and completion of the molecular saturation of the oil in the material under heat.

3. The method of impregnating porous or bibulous material with an oily composition, comprising partial hydrogenation of tung oil, filling the material with the partially hydrogenated oil, and completion of the molecular saturation of the oil in the material under heat.

4. The method of impregnating porous or bibulous material with an oily composition, comprising partial hydrogenation of tung oil, addition to said oil of a solid hydrocarbon solubly miscible therein, filling the material with the compound thus produced, and completion of the molecular saturation of the oil in the material under heat.

5. The method of impregnating porous or bibulous material with an oily composition, comprising partial hydrogenation of tung oil, addition to said oil of a hard asphalt solubly miscible therein, filling the material with the compound thus produced, and completion of the molecular saturation of the oil in the material under heat.

6. The method of impregnating porous or bibulous material with an oily composition, comprising partial hydrogenation of tung oil, addition of gilsonite to said oil, filling the material with the compound thus produced, and completion of the molecular saturation of the oil in the material under heat.

7. Porous or bibulous material, impregnated with an oil molecularly saturated in part by an introduced reagent, and in part heat-polymerized.

8. Porous or bibulous material, impregnated with an oil molecularly saturated in part by hydrogenation, and in part heat polymerized.

9. Porous or bibulous material, impregnated with an oil molecularly saturated in part by hydrogenation, and in part heat polymerized, with asphaltic material distributed through it.

10. Porous or bibulous material, impregnated with tung oil, in part molecularly saturated by an introduced reagent, and in part by heat-polymerization.

11. Porous or bibulous material, impregnated with tung oil in part molecularly saturated by hydrogenation, and in part by heat-polymerization.

12. Porous or bibulous material, impregnated with tung oil, in part molecularly saturated by an introduced reagent, and in part by heat-polymerization, with asphaltic material distributed through it.

13. Porous or bibulous material, impregnated with tung oil, in part molecularly saturated by an introduced reagent, and in part by heat-polymerization with gilsonite distributed through it.

14. Porous or bibulous material, impregnated with tung oil in part molecularly saturated by hydrogenation, and in part by heat-polymerization with gilsonite distributed through it.

15. Brake-lining or the like, comprising a body of porous material uniformly impregnated with a heat-polymerized oil, partially molecularly saturated by union of its free bonds with an introduced reagent.

16. Brake-lining or the like, comprising a body of porous material uniformly impregnated with a heat-polymerized oil, partially hydrogenated.

17. Brake-lining or the like, comprising a body of porous material uniformly impregnated with heat-polymerized, partially hydrogenated tung oil.

18. Brake-lining or the like, comprising a body of porous material containing asbestos fiber, uniformly impregnated with a heat polymerized oil partially molecularly saturated by union of its free bonds with an introduced reagent.

19. Brake-lining or the like, comprising a body of porous material containing asbestos fiber, uniformly impregnated with a heat-polymerized oil, partially hydrogenated.

20. Brake-lining or the like, comprising a body of porous material containing asbestos fiber, uniformly impregnated with heat polymerized, partially hydrogenated tung oil.

21. Brake-lining or the like, comprising a body of porous material uniformly impregnated with a mixture of an asphalt and a heat-polymerized oil, partially saturated by union of its free bonds with an introduced reagent.

22. Brake-lining or the like, comprising a body of porous material uniformly impregnated with a mixture of an asphalt and a heat-polymerized, partially hydrogenated oil.

23. Brake-lining or the like, comprising a body of porous material uniformly impregnated with a mixture of gilsonite and heat-polymerized, partially hydrogenated tung oil.

24. Brake-lining or the like, comprising a body of porous material containing asbestos fiber uniformly impregnated with a mixture of an asphalt and a heat-polymerized oil partially saturated by union of its free bonds with an introduced reagent.

25. Brake-lining or the like, comprising a body of porous material containing asbestos fiber uniformly impregnated with a mixture of an asphalt and a heat-polymerized, partially hydrogenated oil.

26. Brake-lining or the like, comprising a body of porous material containing asbestos fiber uniformly impregnated with a mixture of gilsonite and heat-polymerized, partially hydrogenated tung oil.

Signed by me at New York, N. Y., this 25th day of June, 1920.

WILLIAM R. SEIGLE.